(12) United States Patent
Westervelt et al.

(10) Patent No.: US 9,354,621 B2
(45) Date of Patent: May 31, 2016

(54) SYSTEMS AND METHODS FOR CONTROL OF AN ADAPTIVE-CYCLE ENGINE WITH POWER-THERMAL MANAGEMENT SYSTEM

(71) Applicant: GENERAL ELECTRIC COMPANY, Schenectady, NY (US)

(72) Inventors: Eric Richard Westervelt, Niskayuna, NY (US); Benjamin Paul Breig, Liberty Turnpike, OH (US); Mustafa Tekin Dokucu, Latham, NY (US); Neil Richard Garrigan, Cincinnati, OH (US); William Dwight Gerstler, Niskayuna, NY (US); Javier Armando Parrilla, Fairfield, OH (US)

(73) Assignee: General Electric Company, Niskayauna, NY (US)

( * ) Notice: Subject to any disclaimer, the term of this patent is extended or adjusted under 35 U.S.C. 154(b) by 30 days.

(21) Appl. No.: 14/305,063

(22) Filed: Jun. 16, 2014

(65) Prior Publication Data
US 2015/0362923 A1    Dec. 17, 2015

(51) Int. Cl.
*G05B 13/02* (2006.01)
*G05B 15/02* (2006.01)
*G05D 23/19* (2006.01)

(52) U.S. Cl.
CPC .............. *G05B 13/026* (2013.01); *G05B 15/02* (2013.01); *G05D 23/1917* (2013.01)

(58) Field of Classification Search
CPC ........ B64D 31/14; B64D 13/00; G05D 23/00; G05D 27/02; G05D 7/0635; F05D 2220/76; F05D 2270/06; F05D 2270/331; F05D 2270/44; G05B 13/026; G05B 15/02

USPC ....................................... 701/3; 700/287–289
See application file for complete search history.

(56) References Cited

U.S. PATENT DOCUMENTS

| | | | |
|---|---|---|---|
| 4,038,526 A | 7/1977 | Eccles et al. | |
| 4,130,863 A | 12/1978 | Schweitzer et al. | |
| 4,159,088 A | 6/1979 | Cosley | |
| 5,252,860 A | 10/1993 | McCarty et al. | |
| 5,908,176 A | 6/1999 | Gilyard | |
| 6,341,247 B1 | 1/2002 | Hreha et al. | |
| 7,606,641 B2 | 10/2009 | Allen | |
| 8,086,387 B2 | 12/2011 | Bradley et al. | |
| 8,333,078 B2 | 12/2012 | Kelnhofer | |
| 8,344,912 B2 | 1/2013 | Mitchell et al. | |
| 8,345,454 B1 | 1/2013 | Krolak et al. | |
| 8,352,148 B2 * | 1/2013 | D'Amato ............. | G05B 13/048 60/646 |
| 8,359,128 B1 | 1/2013 | Segal et al. | |
| 8,363,374 B2 | 1/2013 | Martinelli | |

(Continued)

*Primary Examiner* — Nga X Nguyen
(74) *Attorney, Agent, or Firm* — John P. Darling

(57) ABSTRACT

A control system for an adaptive-power thermal management system of an aircraft having at least one adaptive cycle gas turbine engine includes a real time optimization solver that utilizes a plurality of models of systems to be controlled, the plurality of models each being defined by algorithms configured to predict changes to each system caused by current changes in input to each system. The real time optimization solver is configured to solve an open-loop optimal control problem on-line at each of a plurality of sampling times, to provide a series of optimal control actions as a solution to the open-loop optimal control problem. The real time optimization solver implements a first control action in a sequence of control actions and at a next sampling time the open-loop optimal control problem is re-posed and re-solved.

16 Claims, 3 Drawing Sheets

(56) References Cited

U.S. PATENT DOCUMENTS

| | | |
|---|---|---|
| 8,364,329 B2 | 1/2013 | Boorman et al. |
| 8,376,284 B2 | 2/2013 | Lewis et al. |
| 8,396,090 B2 | 3/2013 | Ullman |
| 8,406,936 B1 | 3/2013 | Borumand et al. |
| 8,412,048 B2 | 4/2013 | Dunlap |
| 8,416,099 B2 | 4/2013 | Bailey et al. |
| 8,417,113 B1 | 4/2013 | Harres |
| 8,417,410 B2 | 4/2013 | Moeckly et al. |
| 8,423,206 B2 | 4/2013 | Shapiro et al. |
| 8,432,059 B2 | 4/2013 | Waite et al. |
| 8,432,943 B2 | 4/2013 | Ullman et al. |
| 8,437,893 B2 | 5/2013 | Mead et al. |
| 8,437,904 B2 | 5/2013 | Mansouri et al. |
| 8,447,441 B2 | 5/2013 | Calvignac et al. |
| 2005/0034477 A1 | 2/2005 | Hu |
| 2007/0032941 A1 | 2/2007 | Allen |
| 2008/0250423 A1 | 10/2008 | Bush et al. |
| 2010/0036540 A1 | 2/2010 | Vian et al. |
| 2010/0044515 A1 | 2/2010 | Neto |
| 2010/0101251 A1 | 4/2010 | Kelnhofer |
| 2011/0066306 A1 | 3/2011 | Berthereau |
| 2011/0071774 A1 | 3/2011 | Fonda et al. |
| 2011/0097031 A1 | 4/2011 | Carralero et al. |
| 2011/0101166 A1 | 5/2011 | Schwarze et al. |
| 2011/0120083 A1 | 5/2011 | Giffin et al. |
| 2011/0190963 A1 | 8/2011 | Glassi et al. |
| 2011/0202251 A1 | 8/2011 | Luppold |
| 2012/0025033 A1 | 2/2012 | Huynh et al. |
| 2012/0131902 A1 | 5/2012 | Baughman et al. |
| 2012/0152468 A1 | 6/2012 | Melhart |
| 2012/0165993 A1 | 6/2012 | Whitehouse |
| 2012/0180451 A1 | 7/2012 | Zhou |
| 2012/0316668 A1 | 12/2012 | Knawa et al. |
| 2013/0000927 A1 | 1/2013 | Meier et al. |
| 2013/0003620 A1 | 1/2013 | Dame |
| 2013/0017838 A1 | 1/2013 | Vavrina et al. |
| 2013/0030852 A1 | 1/2013 | Quadracci |
| 2013/0031543 A1 | 1/2013 | Angus |
| 2013/0037234 A1 | 2/2013 | Mackin |
| 2013/0044155 A1 | 2/2013 | Duce et al. |
| 2013/0046423 A1 | 2/2013 | McCarthy et al. |
| 2013/0046714 A1 | 2/2013 | Harris |
| 2013/0067362 A1 | 3/2013 | Cowart et al. |
| 2013/0068747 A1 | 3/2013 | Armatorio et al. |
| 2013/0073120 A1 | 3/2013 | Bailey et al. |
| 2013/0077788 A1 | 3/2013 | Blanchard et al. |
| 2013/0079955 A1 | 3/2013 | Masiello et al. |
| 2013/0085669 A1 | 4/2013 | Bailey et al. |
| 2013/0151039 A1 | 6/2013 | Haillot |
| 2013/0151112 A1 | 6/2013 | Haillot |
| 2013/0253738 A1 | 9/2013 | Fucke |
| 2015/0005990 A1* | 1/2015 | Burns .................. B64D 31/14 701/3 |

* cited by examiner

SYSTEMS AND METHODS FOR CONTROL OF AN ADAPTIVE-CYCLE ENGINE WITH POWER-THERMAL MANAGEMENT SYSTEM

BACKGROUND

The present technology relates generally to systems and methods for model predictive control of an adaptive-cycle gas turbine engine with a power-thermal management system.

Gas turbine engines are produced for both commercial and military air vehicle propulsion. For large commercial platforms, high bypass ratio (BPR) fan engines are typically employed. High BPR fan engines enjoy a relatively high efficiency, as manifested by a low specific fuel consumption. Military platforms, on the other hand, typically employ engines having a high power to weight ratio, which are high thrust, low BPR engines, e.g., for interceptor, fighter and fighter/bomber platforms. Although military aircraft gas turbine engines may exhibit a high thrust to weight ratio, e.g., relative to commercial transport aircraft engines, such engines typically do not achieve the efficiency levels seen in commercial aircraft engines. Rather, such military aircraft gas turbine engines have a higher specific fuel consumption. In order to provide military air vehicles with longer range capability, including under supercruise operating conditions (that is, supersonic flight without the use of thrust augmentation devices, such as afterburners), as well as to provide the high thrust levels preferable for short take off and aggressive maneuvering, it is desirable to have an adaptive, or variable, cycle gas turbine engine. In particular, it is desirable to have a gas turbine engine that may achieve the lower specific fuel consumption typically associated with high BPR engines, and which may also achieve the high thrust and high power-to-weight ratio typically associated with low BPR engines.

Future military aircraft will have considerably more electronics (for countermeasures, jamming, directed energy weapons, etc.) than what is used today. The future aircraft will need megawatt (MW) levels of cooling instead of kilowatt (KW) levels of cooling used today. Current thermal management systems do not supply such large amounts of cooling power. There is a need to provide cooling for on-demand heat loads combined with aircraft fuel tank heat sink storage. On-demand cooling means being able to supply short duration high cooling loads and low cooling load during the majority of the aircraft mission time. Bursts of high cooling loads or power are required during high powered flight and directed energy weapon operation.

The move toward More Electric Aircraft (MEA) is present for both commercial and military aircraft. The MEA trend describes the rapid increase in demand for on-board electric power. For commercial aircraft the main driver is efficiencies gained using electric-powered Environmental Control Systems (ECS) and electric actuation leading to decreased fuel burn. For military aircraft, MEA benefits are not only used for increased range, but can also translate into increased capability. While MEA provides opportunities for system-level improvements, there are associated challenges. These include the maturation of flight-qualified electrical components, complex system design and interaction, and additional thermal loads originating from electrification of aircraft systems.

BRIEF DESCRIPTION

In accordance with one example of the technology disclosed herein, a control system for an adaptive-power thermal management system of an aircraft having at least one adaptive cycle gas turbine engine comprises a real time optimization solver that utilizes a plurality of models of systems to be controlled, the plurality of models each being defined by algorithms and configured to predict changes to each system caused by current changes in input to each system; configured to solve an open-loop optimal control problem on-line at each of a plurality of sampling times, to provide a series of optimal control actions as a solution to the open-loop optimal control problem. The real time optimization solver implements a first control action in a sequence of control actions and at a next sampling time the open-loop optimal control problem is re-posed and re-solved.

In accordance with another example of the technology disclosed herein, a method of controlling an adaptive-power thermal management system of an aircraft having at least one adaptive cycle gas turbine engine comprises receiving signals indicative of parameters of the engine, systems of the aircraft, and the adaptive-power thermal management system; estimating at least one parameter; solving in real time an open-loop optimal control problem at each of a plurality of sampling times using the at least one parameter as an initial state of each system to be controlled; providing a series of control actions as a solution to the open-loop optimal control problem, wherein a plurality of models of systems to be controlled are each defined by algorithms configured to predict changes to each system caused by current changes in input to each system, wherein the method further comprises implementing a first control action in a sequence of control actions; and at a next sampling time, re-posing and solving the open-loop optimal control problem.

DRAWINGS

These and other features, aspects, and advantages of the present technology will become better understood when the following detailed description is read with reference to the accompanying drawings in which like characters represent like parts throughout the drawings, wherein.

DETAILED DESCRIPTION

Figure 1:
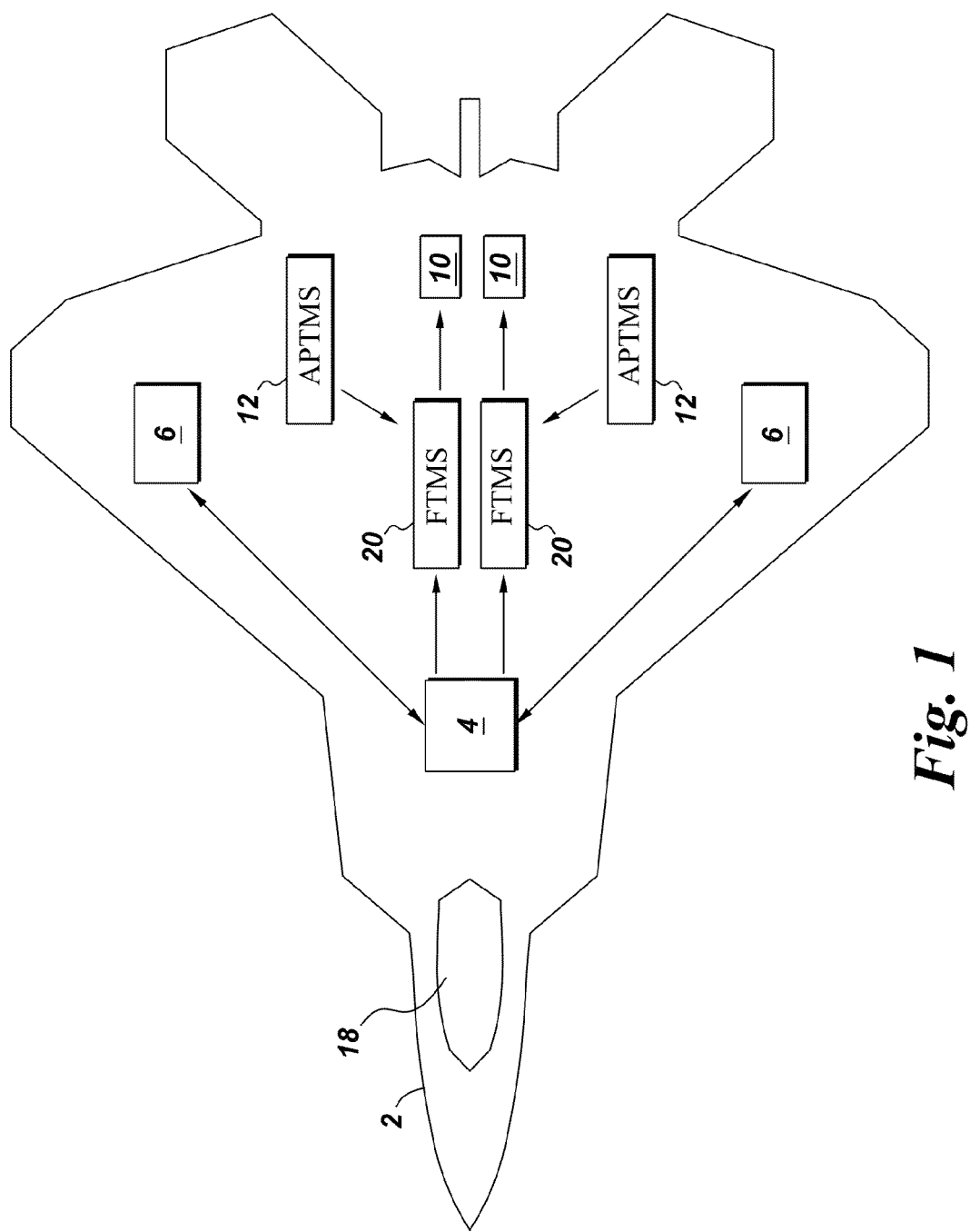
FIG. 1 is a diagrammatical view illustration of a gas turbine engine powered aircraft having a model predictive control of an adaptive power and thermal management system (APTMS) according to an example of the present technology.

Referring to FIG. 1, gas turbine engine powered aircraft 2 may have gas turbine engines 10 and an internal fuel tank(s) 4 and wet wing fuel tanks 6 for storing aircraft fuel. The engines 10 may be a turbo fan, turbo jet, adaptive, or variable, cycle gas turbine engines, for example as disclosed in U.S. 2012/0131902 A1 or U.S. 2011/0120083 A1, both being incorporated herein by reference. Although two engines are shown, it should be appreciated that one engine, or more than two engines, may be provided to the aircraft 2. The wing fuel tanks 6 are referred to as wet because they are housed in the wings and subject to cooling and heating of ambient air through which the aircraft flies. The aircraft 2 includes one or more adaptive power and thermal management system(s) (APTMS) 12 powered by one or both of the gas turbine engines 10.

Figure 2:
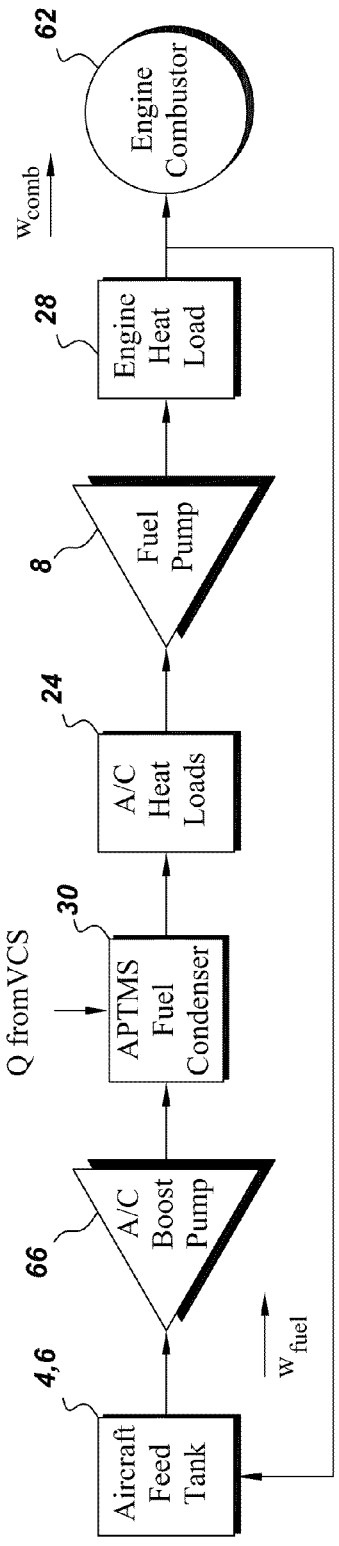
FIG. 2 is a schematic illustration of a fuel thermal management system model.
Figure 3:
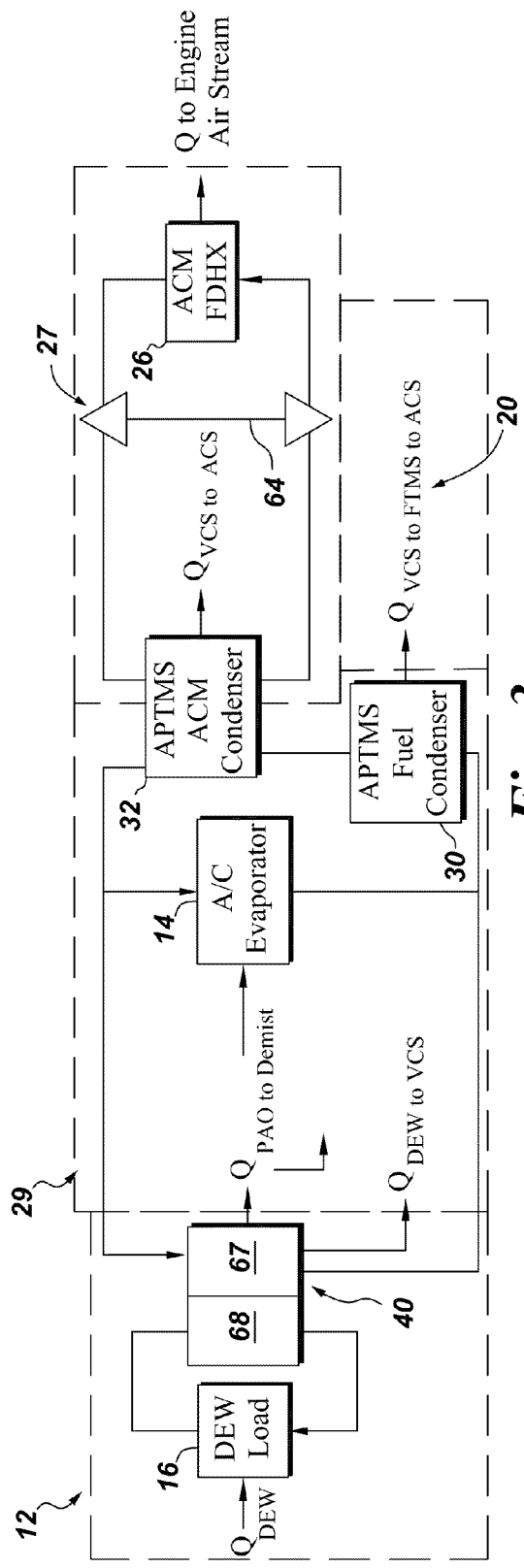
FIG. 3 is a schematic illustration of an Adaptive Power & Thermal Management System (APTMS)

Referring to FIGS. 1-3, the APTMS 12 includes four interconnected sub-systems: a Fuel Thermal Management System(s) (FTMS) 20, which may include the internal fuel tank(s) 4, fuel pumps, heat exchangers, fuel valves, and the engine combustor(s) 62; a Directed Energy Weapon (DEW) thermal management system 40, which may include an evaporator 67 and a thermal energy storage device 68; a Vapor Cycle System (VCS) 29, which may include condensers 30, 32, evaporator(s) 14, refrigerant valves, and refrigerant pumps; and an Air Cycle System (ACS) 27, which may include an air cycle machine 64, the engines' third streams, heat exchanger(s) 26, and air valves. Additionally, the APTMS serves as the environmental control system (ECS) to provide cooling for liquid and air cooled aircraft components and equipment as well as thermal control and pressurization for the cockpit 18. The environmental control system may be cooled by the variable cooling power ACS 27 and the VCS 29. The ACS 27 may include the variable speed air cycle machine (ACM) 64 and an intercooler including the air to air duct heat exchanger 26, as disclosed in, for example, U.S. Pat. No. 8,522,572, incorporated herein by reference.

Referring still to FIGS. 1-3, the model predictive control of the APTMS 12 includes models of these four sub-systems 20, 27, 29, 40 that are created of the sub-systems' physics.

As shown in FIG. 2, the FTMS 20 model includes the internal fuel tank(s) 4 and/or wet wing fuel tank(s) 6, fuel pump(s) 8, heat loads and exchangers 24, 28, a condenser 30, and the combustor 62. The arrows indicate the direction of fuel flow. The controlled input is the fuel flow rate $W_{fuel}$. The exogenous inputs are the heat flow rates $Q_{from\,VCS}$, $Q_{DEW}$, and combustor fuel flow rate $W_{comb}$. The input that is an output from another sub-system(s) are the heat flow rate $Q_{from\,VCS\,to\,ACS}$ and $Q_{VCS\,to\,FTMS\,to\,ACS}$.

The fuel flow rate $W_{fuel}$ is pressurized by the A/C boost pump 66 and the fuel pump 8. Both the burn fuel ($W_{comb}$) and the return to tank are controlled by the engine such that $W_{fuel}$ must be greater than or equal to $W_{comb}$. Therefore, the rate of change of the main fuel tank mass is $$\dot{M}_{fuel\,main} = W_{fuel} - W_{comb} \qquad (1)$$

where $M_{fuel\,main}$ is the mass of fuel in the main tank.

The APTMS fuel condenser 30, the A/C heat loads 24, and engine heat load heat exchangers 28 are modeled assuming a fixed mass with equal inflow and outflow. Hence, the dynamics of the heat exchangers are assumed to be first-order of the form $$\dot{T}_{HX\,out} = \frac{1}{M_{HX}}\left(W(T_{HX\,in} - T_{HX\,out}) + \frac{Q}{C_P}\right), \qquad (2)$$

where $T_{HX\,in}$ and $T_{HX\,out}$ are the temperatures of the fuel in and out of the heat exchanger, W is the fuel flow through the heat exchanger, $M_{HX}$ is the mass of the fuel inside the heat exchanger, Q is the heat flow to or from the fuel, and $C_P$ is the specific heat of the fuel in the heat exchanger. The dynamics of the VCS/FTMS condenser 30 and FTMS/ACS heat exchanger 26 are explained below.

The power consumed by the FTMS 20 is assumed to be $P_{FTMS\,fuel} \alpha \eta_{FTMS\,fuel}^{-1} W_{fuel}$, where $0 \le \eta_{FTMS\,fuel}^{-1} \le 1$. It is understood that this assumption provides an approximation.

Referring to FIG. 3, the DEW thermal management system 40 is assumed to include the thermal energy storage device 68 with a coolant to remove heat from the DEW load 16. The arrows indicate the direction of fuel flow. The model also includes a heat exchanger (e.g. evaporator 67) as part of the thermal energy storage system 40. The controlled input is $Q_{DEW \to VCS,cmd}$. The exogenous input is $Q_{DEW}$.

Referring to FIG. 3, VCS 29 model includes two condensers 30, 32, one of which is the VCS/FTMS condenser 30 from the FTMS 20. The arrows indicate the flow of coolant (e.g. refrigerant). The model further includes two evaporators 14, 67, one of which is the coolant evaporator 67 from the DEW thermal management system 40. The model further may further include a compressor (not shown). The system does not have any controlled inputs. The exogenous input is $Q_{PAO\text{-}Demist}$. The inputs that are outputs from other sub-systems are the heat flow rates $Q_{VCS \to ACS}$ and $Q_{DEW \to VCS}$. The output is $Q_{VCS \to FTMS \to ACS}$.

The performance of the VCS 29 is modeled using an actual Coefficient of Performance ($COP_a$) analysis. $COP_a$ is a function of the condenser exit temperature $T_{cond}$ and is defined as $$COP_a(T_{cond}) := \frac{Q_{evap\,total}}{P_{comp}(T_{cond})}, \qquad (3)$$

where $Q_{evap\,total}$ is the total heat rejected by the VCS 29 and $P_{comp}$ is the power consumed by the compressor. The total heat rejected by the VCS 29 is $$Q_{cond\,total} = Q_{evap} + P_{comp}. \qquad (4)$$

As a consequence, whenever $Q_{VCS \to ACS}$ is less than $Q_{cond\,total}$, the fuel in the FTMS system is being heated.

The power consumed by the VCS is $$P_{VCS} = \frac{Q_{evap}}{COP_a}. \qquad (5)$$

Referring to FIG. 3, ACS 27 model includes a condenser 32 and a heat exchanger 26. The system has controlled inputs $Q_{VCS \to ACS}$. The system does not have any exogenous inputs. The heat exchanger ACM FDHX 26 rejects heat to the engine fan or third stream air. The gas turbine engine can then adapt the amount of heat rejected to the air stream by controlling airflow though geometric changes or engine speed settings.

The power consumed by the ACS 27 is modeled as $$P_{ACS} = \frac{1}{\eta_{ACS}}(Q_{VCS \to ACS}). \qquad (6)$$

The APTMS 12 provides the ability to address adaptively the various aircraft system heat loads. Ideally, all waste heat would be transferred to the fuel as it is supplied to the engine(s) since the fuel is the aircraft's most efficient heat sink. However, increased heat loads combined with decreased fuel burn results in less fuel thermal capacity. As a result, heat has to be removed to the ambient air, but this heat removal causes drag and reduces the benefit of electrification. The APTMS 12 moves heat into the fuel whenever possible, but then directs the heat to the ambient air when necessary. The specifics of any particular APTMS 12 scheme can be analyzed to determine the best mode of operation for any given mission. The use of Model Predictive Control (MPC) has the potential to improve the performance of the system on-line and satisfy the system constraints (e.g. amplitude, rate, and dynamic) in a unified and systematic framework. The use of MPC does not require detailed a priori knowledge of the aircraft mission.

The objective of controlling the APTMS 12 is to reduce, or minimize, a cost function associated with the operation of the system while satisfying all constraints associated with the system operation. Example cost function terms include the energy required to operate the APTMS and the fuel required to operate the APTMS. Example constraints include limits on fuel temperatures and limits on rates of change of the setpoint of advanced cycle sub-systems. This control problem will be posed as an MPC problem.

Model predictive control (MPC), or receding horizon control, is a control methodology in which the current control action is obtained by solving an optimization problem on-line at each sampling instant. The optimization problem is a finite horizon open-loop optimal control problem where the current state of the aircraft is used as the initial state and the sequence of control actions into the finite horizon is the solution to the optimization problem. As its name implies, MPC requires a model of the system to be controlled. The use of a model enables the MPC algorithm to predict into the future and consider the effects of the current input changes on the future evolution of the system in an optimal way. As used herein the term "optimal" and its variants (e.g. "optimized" and/or "optimization," etc.) refers to functionality of the control strategy involving minimization and/or maximization of one or more performance metrics of the aircraft and/or its systems, e.g. minimization of fuel consumption or maximization or minimization of heat exchanged. In MPC, the first control action in the sequence of control actions is implemented and at the next sampling time the optimization problem is re-posed and solved again with the finite horizon shifted by one sampling time; as implied by the alternative name to MPC, receding horizon control. The recursive on-line optimization gives MPC its robustness—that is, a very accurate model is not necessary, since the control is corrected repeatedly and also the unmeasured disturbances will be mitigated by the repeated optimization. As the control action to the aircraft is the result of a finite-horizon optimization problem, operational constraints can be handled explicitly by MPC by expressing these constraints in terms of decision variables and appending them to the optimization problem. The objective function of the formal problem being solved by MPC at each sampling time can be presented as $$J_k = \sum_{i=k}^{k+N} \frac{1}{2}\left[(y_i - y_{i,ref})^T P(y_i - y_{i,ref}) + (x_i - x_{i,ref})^T Q(x_i - x_{i,ref}) + \frac{1}{2}\Delta u_i^T T \Delta u_i + y_i^T L_y + x_i^T L_x\right] + \frac{1}{2}x_{k+N}^T Q_N x_{k+N} \quad (7)$$

where k is the current sampling time; N is the horizon length; y is the vector of performance outputs; x is the vector of states; u is the vector of manipulated variables; $\Delta u_k \triangleq u_{k+1} - u_k$ is the delta change in control; P, Q, T, $L_x$, $L_y$, $Q_N$ are the optimization weights of output tracking, state tracking, control input delta change, output economic objective, state economic objective, state terminal value, respectively; and the subscript "ref" is used to represent the reference trajectory of the outputs and states. In the APTMS control problem, a simplified objective function may include only quadratic terms representing the gap between the performance outputs and their respective reference trajectories and quadratic terms representing the control effort. This simplified objective function is of the form $$J_{APTMS,k} = \sum_{i=k}^{k+N} \frac{1}{2}\left[y_i^T P y_i + \frac{1}{2}\Delta u_i^T T \Delta u_i\right]. \quad (8)$$

The MPC problem is solved subject to the differential-algebraic equations that represent the model of the system and the additional constraints that the control designer may desire. The model constraints can be expressed as $$x_{i+1} = F_{\Delta t}(x_i, u_i, z_i)$$

$$y_i = G(x_i, u_i, z_i)$$

$$0 = H(x_i, u_i, z_i) \quad (9)$$

for i=k, ..., k+N, where z represents the algebraic variables of the system model, $F_{\Delta t}$ represents the discrete-time state update function, G is the output function, and H corresponds to the algebraic constraints. In the APTMS control problem the model constraints are essentially the representation of the APTMS system in the proper differential-algebraic form.

Control-design-related constraints resulting from the operational constraints of the aircraft on outputs, states, algebraic variables, inputs, and linear combinations of these variables as well as the rates of changes of these variables are imposed within the MPC framework and can be represented as $$L \leq C_x x_i + C_y y_i + C_z z_i + C_u u_i \leq U$$

$$L_R \leq C_{rx}\Delta x_i + C_{ry}\Delta y_i + C_{rz}\Delta z_i + C_{ru}\Delta u_i \leq U_R \quad (10)$$

for i=k, ..., k+N, where L and U are the lower and upper bound constraints; $L_R$ and $U_R$ are the lower and upper bound rate constraints; $C_x$, $C_y$, $C_z$, and $C_u$ are the coefficient matrices for bound constraints on states, outputs, algebraic variables, and inputs, respectively; and similarly $C_{rx}$, $C_{ry}$, $C_{rz}$, and $C_{ru}$ are the coefficient matrices for bound constraints on the rates of states, outputs, algebraic variables, and inputs, respectively. The decision variables of the optimization problem are, the inputs, states, and the algebraic variables for the time period extending from the current time step, k, to the end of the horizon, k+N (i.e. $u_i$, $x_i$, $z_i$, for i=k, ... k+N). The APTMS control problem may have hard constraints (i.e., computed control actions must obey the constraints) and soft constraints (i.e., control actions that violate the constraints are penalized) on the states, performance outputs, inputs, and rate of change of inputs. It must be noted that although the form of the constraints are shown to be linear in Eq. 10, nonlinear operational constraints can also be included in the optimization problem by proper linearization.

Figure 4:
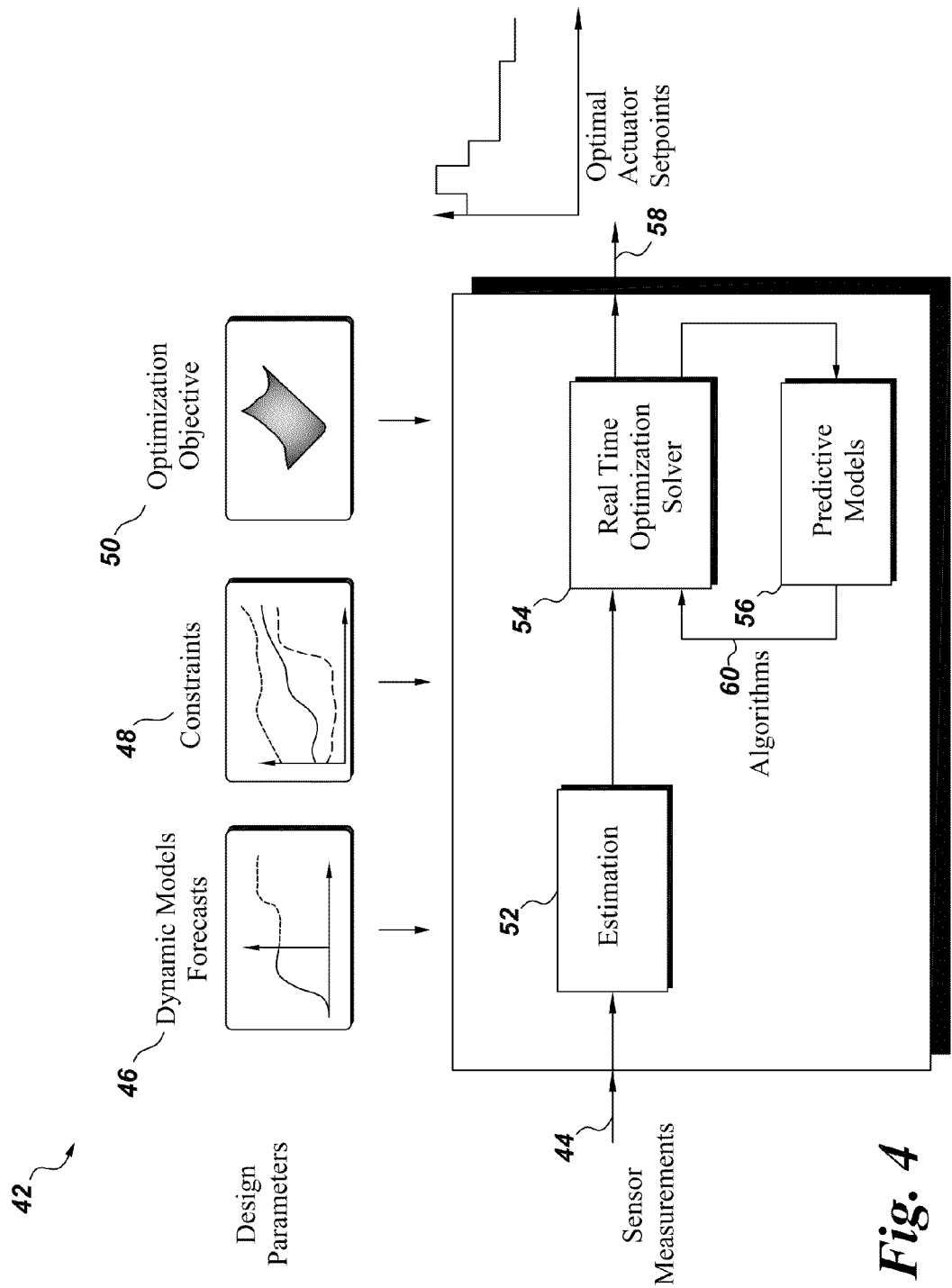
FIG. 4 is a schematic illustration of a control system for an adaptive-power thermal management system of an aircraft having at least one adaptive cycle gas turbine engine.

Referring to FIG. 4, a control system 42 for an APTMS of an aircraft includes a sensor suite 44 arranged to sense a plurality of signals in an aircraft 2, including the engine and systems and sub-systems described herein, and other systems not specifically described herein, for example other heat exchangers and fuel driven hydraulic systems. The sensed signals may be indicative of aircraft, system, and sub-system parameters. At least some of the parameters sensed by sensor suite 44 may be supplied to an estimator 52 to estimate at least one or more parameters. The parameters estimated by the estimator 52 are provided to a real time optimization solver 54 that utilizes the predictive models 56 to solve the real time optimization problem for controlling the thermal loads of the aircraft. In addition to the sensor signals, the control system 42 takes as inputs dynamic model forecasts 46, constraints 48 and optimization objectives 50. The dynamic model forecasts include forecasts prior to (i.e. post) to the sampling time and future forecasts. The forecasts include the mission state and the mission profile. The mission state includes the engine state (e.g. third-stream temperature, fuel flow, etc.), the aircraft state (e.g. altitude, mach number, ambient temperature, etc.), and power-thermal management system state (e.g. heat-sink temperatures, fuel/coolant-flow rates, etc.). The mission profile is the forecasted profiles of the mission states. The constraints 48 are known and designed for the aircraft. The optimization objectives may include, for example, fuel consumption, range, life, probability of kill, and mission completion.

The predictive models 56 are used by algorithms 60 such as those disclosed herein to determine if the real time optimization solver 54 has provided the optimal solution. The outputs 58 of the supervisory control strategy are the reference inputs to the subsystems/components of the power-thermal management system. These subsystem/component inputs may include, for example, bleed flow commands, electrical system load commands, cooling load commands, and valve position commands. The control system 42 may also estimate unmeasurable system states, such as certain flows, and may estimate system, subsystem, or component degradation.

The present technology uses iterative online optimization with the option to include parameter and/or state estimation to provide supervisory control to a power-thermal management system coupled to an adaptive-cycle engine. The approach is able to exploit the varying thermodynamic conditions and state of the subsystems to affect a variety of outcomes such as reducing fuel consumption, increasing flight range, and thermal heat sink availability. The strategy uses knowledge of the mission profile in the optimization problem that is solved to achieve optimal mission states. The strategy may estimate system deterioration to optimize system performance. Online optimizing supervisory control enables flexible mission execution while affecting a variety of desirable outcomes, such as minimal fuel consumption, maximized flight range, or maximized thermal heat sink availability.

In accordance with another example of the technology disclosed herein, a method of controlling an adaptive-power thermal management system of an aircraft having at least one adaptive cycle gas turbine engine comprises a real time optimization solver solving an open-loop optimal control problem on-line at each of a plurality of sampling times, where the real time optimization solver is computing a series of control actions to achieve optimal control of a plurality of models of systems representing the overall adaptive-power thermal management system. The real time optimization solver implementing the first control action of the computed optimal sequence of control actions at each sampling time and at the next sampling time, the open-loop optimal control problem is being re-posed and re-solved. A plurality of models of the systems representing overall the adaptive-power thermal management system are embedded in the real time optimization solver, enabling the prediction of changes to each system's behavior caused by current changes in the inputs to each system. The real time optimization solver can be coupled to a model-based estimator that is receiving signals from a sensor suite, the signals being indicative of parameters of the engine, systems of the aircraft, and the adaptive-power thermal management system, and estimating at least one parameter on-line in order to improve the predictive capability of the plurality of models of the systems representing the overall adaptive-power thermal management system by either estimating at least one parameter as an initial state of at least one of the predictive models or as an uncertain parameter of these system models. The model-based estimator also utilizing a plurality of models of the systems representing the overall adaptive-power thermal management system used in conjunction with model-based estimation algorithms such as Kalman filtering, extended Kalman filtering, and similar linear/nonlinear model-based estimation methodologies.

In accordance with another example of the technology disclosed herein, a control system for an adaptive-power thermal management system of an aircraft having at least one adaptive cycle gas turbine engine comprises a real time optimization solver that is configured to solve an open-loop optimal control problem on-line at each of a plurality of sampling times, where the real time optimization solver is configured to compute a series of control actions to achieve optimal control of a plurality of models of systems representing the overall adaptive-power thermal management system. The real time optimization solver implements the first control action of the computed optimal sequence of control actions at each sampling time and at the next sampling time, the open-loop optimal control problem is re-posed and re-solved. A plurality of models of the systems representing overall the adaptive-power thermal management system are embedded in the real time optimization solver, enabling the prediction of changes to each system's behavior caused by current changes in the inputs to each system. The real-time optimization solver can be coupled to a model-based estimator that is configured to receive signals from a sensor suite, the signals being indicative of parameters of the engine, systems of the aircraft, and the adaptive-power thermal management system, and estimate at least one parameter on-line in order to improve the predictive capability of the plurality of models of the systems representing the overall adaptive-power thermal management system by either estimating at least one parameter as an initial state of at least one of the predictive models or as an uncertain parameter of these system models. The model-based estimator also utilizes a plurality of models of the systems representing the overall adaptive-power thermal management system used in conjunction with model-based estimation algorithms such as Kalman filtering, extended Kalman filtering, and similar linear/nonlinear model-based estimation methodologies.

It is to be understood that not necessarily all such objects or advantages described above may be achieved in accordance with any particular example. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the present technology have been illustrated and described herein, many modifications and changes will occur to those skilled in the art. It is, therefore, to be understood that the appended claims are intended to cover all such modifications and changes.

The invention claimed is:

1. A control system for an adaptive-power thermal management system of an aircraft having at least one adaptive cycle as turbine engine, the control system comprising:
    a real time optimization solver that utilizes a plurality of models of systems to be controlled, the plurality of models each being defined by algorithms configured to predict changes to each system caused by current changes in input to each system and configured to solve an open-loop optimal control problem on-line at each of a plurality of sampling times, to provide a series of optimal control actions as a solution to the open-loop optimal control problem,
    wherein the real time optimization solver implements a first control action in a sequence of control actions and at a next sampling time the open-loop optimal control problem is re-posed and re-solved and is coupled to a model-based estimator that is configured to receive signals from a sensor suite, the signals being indicative of parameters of the engine systems of the aircraft, and the adaptive-power thermal management system, and estimate at least one parameter on-line in order to improve the predictive capability of the plurality of models of the systems representing the overall adaptive-power thermal management system by either estimating at least one parameter as an initial state of at least one of the predictive models or as an uncertain parameter of these system models, and wherein the plurality of models includes a fuel thermal management system model, a directed energy weapon thermal management system model, a vapor cycle system model, and an air cycle system model.

2. The control system of claim 1, wherein the fuel thermal management system model comprises an internal fuel tank of the aircraft, a fuel pump, a plurality of heat exchangers, a condenser, and a combustor of the at least one engine.

3. The control system of claim 2, wherein the vapor cycle system model includes a compressor, a plurality of condensers, and a plurality of heat exchangers, and one condenser of the vapor cycle system model corresponds to one condenser of the fuel thermal management system model.

4. The control system of claim 3, wherein air cycle system model includes a condenser and a heat exchanger, and the condenser of the air cycle system corresponds to one of the condensers of the vapor cycle system and the heat exchanger of the air cycle system corresponds to one of the heat exchangers of the fuel thermal management system.

5. The control system of claim 1, wherein inputs to the real time optimization solver include a mission profile of the aircraft that is a forecast of profiles of mission states including engine states, aircraft states, and adaptive-power thermal management system states.

6. The control system of claim 5, wherein the engine states include third-stream temperatures of the at least one engine and/or fuel flow, the aircraft states include altitude, mach number, and/or ambient temperature, and the adaptive-power thermal management system states include heat-sink temperatures, fuel flow rates, and/or coolant flow rates.

7. The control system of claim 1, wherein the control action comprises bleed flow commands, electrical system load commands, cooling load commands, and/or valve position commands.

8. The control system of claim 7, wherein the solution comprises fuel consumption reduction, flight range increase, and/or thermal heat sink availability.

9. A method of controlling an adaptive-power thermal management system of an aircraft having at least one adaptive cycle gas turbine engine, the method comprising:
  receiving signals indicative of parameters of the engine, systems of the aircraft, and the adaptive-power thermal management system;
  estimating at least one parameter;
  solving in real time an open-loop optimal control problem at each of a plurality of sampling times using the at least one parameter as an initial state of each system to be controlled;
  providing a series of control actions as a solution to the open-loop optimal finial control problem, wherein a plurality of models of systems to be controlled are each defined by algorithms configured to predict changes to each system caused by current changes in input to each system, wherein the method further comprises
  implementing a first control action in a sequence of control actions; and
at a next sampling time, re-posing and solving the open-loop optimal control problem, wherein the plurality of models includes a fuel thermal management system model, a directed energy weapon thermal management system model, a vapor cycle system model, and an air cycle system model, and wherein the fuel thermal management system model comprises an internal fuel tank of the aircraft, a fuel pump, a plurality of heat exchangers, a condenser, and a combustor of the at least one engine.

10. The method of claim 9, wherein the directed energy weapon thermal management system model includes a hot fuel tank, a cold fuel tank, a hot to cold pump, a cold to hot pump, and a plurality of heat exchangers.

11. The method of claim 10, wherein the vapor cycle system model includes a compressor, a plurality of condensers, and a plurality of heat exchangers, and one condenser of the vapor cycle system model corresponds to one condenser of the fuel thermal management system model.

12. The method of claim 11, wherein air cycle system model includes a condenser and a heat exchanger, and the condenser of the air cycle system corresponds to one of the condensers of the vapor cycle system and the beat exchanger of the air cycle system corresponds to one of the heat exchangers of the fuel thermal management system.

13. The method of claim 9, further comprising further comprising generating a mission profile of the aircraft as input to the open-loop optimal control problem that is a forecast of profiles of mission states including, engine states, aircraft states, and adaptive-power thermal management system states.

14. The method of claim 13, wherein the engine states include third-stream temperatures of the at least one engine and/or fuel flow, the aircraft states include altitude, mach number, and/or ambient temperature, and the adaptive-power thermal management system states include heat-sink temperatures, fuel flow rates, and/or coolant flow rates.

15. The method of claim 9, wherein the control action comprises bleed flow commands, electrical system load commands, cooling load commands, and/or valve position commands.

16. The method of claim 15, wherein solving comprises determining fuel consumption reduction, flight range increase, and/or thermal heat sink availability.

* * * * *